May 20, 1958    E. W. BUCK    2,835,148
ELECTRO-MAGNETIC DRILL CHUCK
Filed Jan. 23, 1956    2 Sheets-Sheet 1
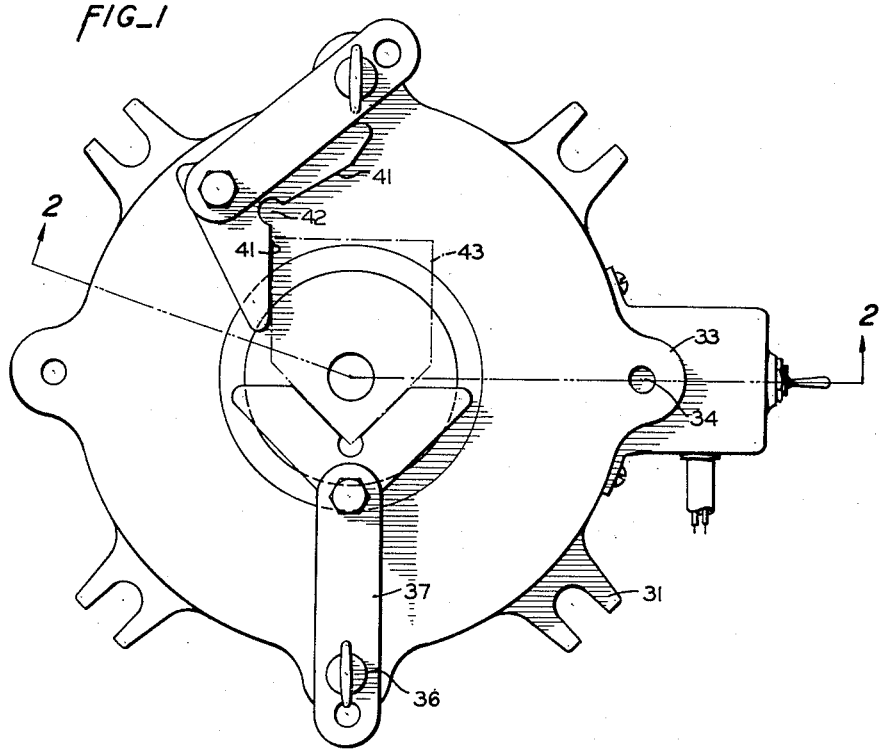
FIG_1
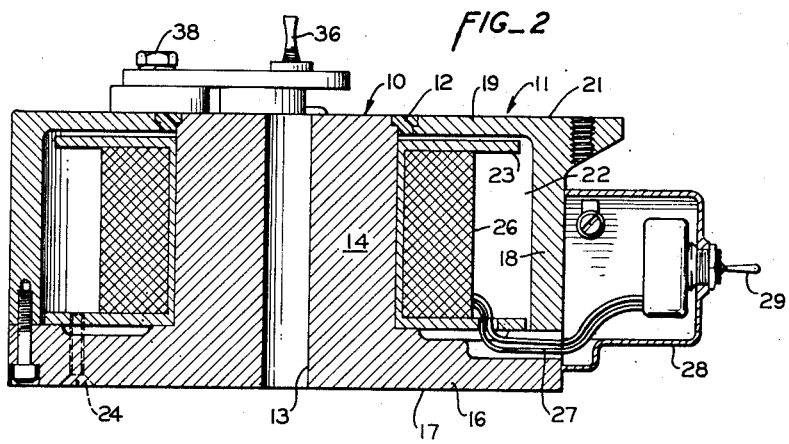
FIG_2
INVENTOR.
EUGENE W. BUCK
BY
ATTORNEY May 20, 1958  E. W. BUCK  2,835,148
ELECTRO-MAGNETIC DRILL CHUCK
Filed Jan. 23, 1956  2 Sheets-Sheet 2
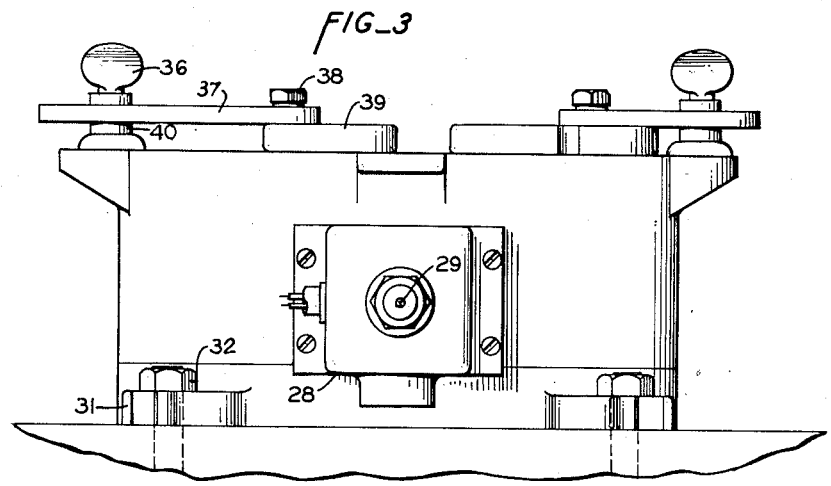
FIG_3
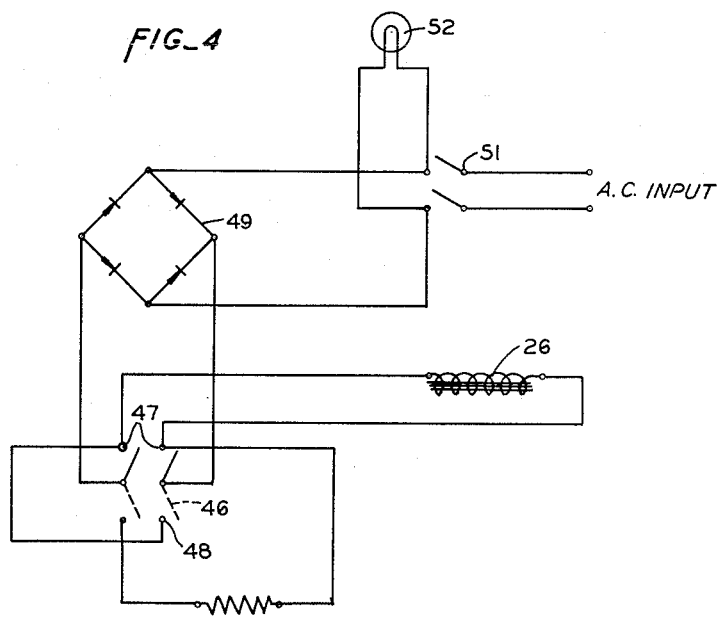
FIG_4
INVENTOR.
EUGENE W. BUCK
BY
*Harper Allen*
ATTORNEY

United States Patent Office 2,835,148
Patented May 20, 1958

2,835,148

ELECTRO-MAGNETIC DRILL CHUCK

Eugene W. Buck, Campbell, Calif.

Application January 23, 1956, Serial No. 560,587

5 Claims. (Cl. 77—63)

The present invention relates to electro-magnetic drill chucks for use in connection with metal working tools such as a drill press, for example, and is concerned more particularly with an improved structure which is capable of easy mounting on the work table of a machine tool, and which is constructed for easy mounting of the work in exact position on the magnet of the drill chuck so as to enable fast, accurate positioning of the work for successive drilling operations with respect to a series of the same piecees.

It is the general object of the invention to provide an improved electro-magnetic drill chuck.

It is aother object of the invention to provide a drill chuck constructed to allow a desirable flux density at the working face of the magnet, so as to enhance the holding power of the magnet.

Another object of the invention is to provide a magnetic pole structure for an electro-magnetic drill chuck, which will enable efficient operation of the drill chuck, and a reduced cost of manufacture of the drill chuck structure.

Other objects and advantages of the invention will be apparent from the following description of a preferred embodiment of the invention, taken in conjunction with the accompanying drawings, in which:

Figure 1 is a plan view of an electro-magnetic drill chuck embodying my invention.

Figure 2 is a sectional view of the drill chuck taken in planes indicated by the line 2—2 of Figure 1.

Figure 3 is a side elevation or view of the drill chuck showing it bolted in place on the work table of a drill press.

Figure 4 is a schematic wiring diagram suitable for use with the drill chuck.

The drill chuck of the instant invention includes a center or inner pole member 10, and an outer pole member 11 spaced apart at the working face of the chuck to provide a magnetic gap which is filled by T-shaped circular ring 12 of non-magnetic material. The inner pole member 10 has a central aperture 13 extending through a thick center pole piece 14 thereof, terminating at the bottom in an outwardly extending flange 16 providing the bottom table engaging surface 17. The outer and complementary pole member 11 has an annular rim or leg 18, which at its lower face is in flush engagement with the upper surface of the flange 16 of the inner pole member 10, and at the top has an inwardly extending flange 19 to form with the upper end of pole member 10 the work surface of the chuck.

The two pole members 10 and 11 enclose annular space 22, in which a suitable non-magnetic spool 23 is secured by a screw 24. The spool 23 carries a coil 26, the lead wires 27 of which extend out into a switch box 28, having an on and off switch 29 therein for the winding 26.

The thickness of the lower flange 16 of the inner pole member 10 is such as to carry easily substantially the entire magnetic flux which can be generated by the coil 26, but the inwardly projecting flange 19 of the outer pole member 11 is of a thickness insufficient to carry all of this flux, so that the normal condition of the electromagnet when no work piece is engaged therewith, is for a number of lines of force to escape into the air as a path of return, thereby providing an ample supply of flux lines or magnetic holding power when a work piece is engaged with both of the pole members 10 and 11.

To enable securing of the chuck in place on the work table, the bottom flange 16 of the inner pole member 10 is provided around its periphery by a plurality of forked ears or extensions 31 providing for the reception of bolts 32 (Fig. 3). The outer periphery of the flange 19 of the outer pole member 11 is correspondingly provided with a plurality of apertured ears 33, the apertures 34 being threaded to receive fastening screws or wing nuts 36 for a jig mounting fixture including an inwardly projecting arm 37 clamped on one ear 33 between a wing nut 36 and a suitable spacing sleeve 40. At its other end each arm 37 is attached by means of a cap screw 38 to an angle shaped work receiving jig 39 having two work engaging faces 41 at a selected angle to each other, and terminating at an intermediate recess 42 to receive a work piece such as the piece 43 indicated in phantom lines on Figure 1.

The circuit illustrated in Figure 4 of the drawings includes the coil of 26, connected to a double pole double throw switch 46, including terminals 47 for normal operation of magnet 26 and terminals 48 for a momentary reversal of the current in the coil 26. From the switch 46, the circuit extends to a full wave bridge type rectifier 49, which is connected through a switch 51 to a source of A. C. input, with a signal light 52 interposed in the circuit. The above circuit is conventional, and any suitable circuit arrangement can be used.

While I have shown and described a preferred embodiment invention, the invention is capable of variation and modification from the form shown so that the scope thereof should be limited only by the proper scope of the claims appended hereto.

I claim:

1. An electro-magnetic drill chuck including a center pole member having an upper pole face and provided with a central aperture therein, said center pole member having a bottom flange projecting outwardly therefrom and providing a bottom planar supporting surface, a second pole member having a horizontally extending annular flange providing an upper pole surface lying in the same plane as the upper pole surface of said center pole member and also having a downwardly projecting annular flange seated at the bottom on the outwardly projecting bottom flange of said center pole member, means securing said pole members together, said pole members when secured together defining an inner annular space, an electro-magnetic coil within said annular space, and a non-magnetic ring secured between said pole members at the pole faces thereof and providing a magnetic gap in the working face of the chuck.

2. An electro-magnetic drill chuck including a center pole member having an upper pole face and provided with a central aperture therein, said center pole member having a bottom flange projecting outwardly therefrom and providing a bottom planar supporting surface, a second pole member having a horizontally extending annular flange providing an upper pole surface lying in the same plane as the upper pole surface of said center pole member and also having a downwardly projecting annular flange seated at the bottom on the outwardly projecting bottom flange of said center pole member, means securing said pole members together, said pole members when secured together defining an inner annular space, an electro-magnetic coil within said annular space, a nonmagnetic ring secured between said pole members at the pole faces thereof and providing a magnetic gap in the working face of the chuck, said projecting bottom flange being substantially thicker than said horizontally extending flange and being capable of carrying substantially the entire flux from said electro-magnetic coil when energized.

3. In an electromagnetic drill chuck having a center annular pole member of substantially angle-shaped cross-section, and an annular outer pole member of substantially angle-shaped cross-section, means fastening said pole members together to provide an annular space encompassed thereby, said chuck also including an electro-magnetic coil in said annular space; a series of fastening stations for said chuck formed integrally with said center pole member about the periphery thereof, a series of fastening stations at the work-holding surface of said chuck formed integrally with said outer pole member, and a plurality of jig-holding members secured for pivotal adjustment in at least certain of said fastening stations and being movable across the work-holding face of said chuck.

4. An electromagnetic drill chuck including an annular center pole member of generally L-shaped cross-section and provided with an upper pole face having a center aperture therein, a second annular outer pole member of generally L-shaped cross-section having a horizontally inwardly extending annular flange providing an upper pole face of said center pole member, said outer pole member also having a downwardly projecting annular flange forming the outer side surface of said chuck and seated at the bottom on the outwardly projecting bottom flange of said center pole member, means securing said pole members together to define an inner annular space, an electromagnetic coil within said annular space, a nonmagnetic ring secured between said pole members at the upper pole faces thereof to provide a magnetic gap in the working face of the chuck, said projecting bottom flange being substantially thicker than said horizontally extending flange and being capable of carrying substantially the entire flux from said magnetic coil when energized.

5. An electromagnetic drill chuck as recited in claim 4, which includes a switch box secured to the outside side surface of said chuck, a switch mounted in said box, wiring extending from said switch to said coil, and said projecting bottom flange being recessed to provide a passage for said wiring.

References Cited in the file of this patent

UNITED STATES PATENTS

| | | |
|---|---|---|
| 843,312 | Vance | Feb. 5, 1907 |
| 1,488,221 | Swissgabel | Mar. 25, 1924 |
| 2,548,314 | Kinney | Apr. 10, 1951 |